(12) United States Patent
Larsson et al.

(10) Patent No.: US 10,436,135 B2
(45) Date of Patent: Oct. 8, 2019

(54) HAND-HELD POWER TOOL, RELATED CONTROL SYSTEM AND ITS USE, AND METHOD OF CONTROLLING SAID TOOL

(71) Applicant: HUSQVARNA AB, Huskvarna (SE)

(72) Inventors: Mikael Larsson, Jönköping (SE); Henrik Eklund, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/781,841

(22) PCT Filed: Dec. 7, 2015

(86) PCT No.: PCT/EP2015/078852
§ 371 (c)(1),
(2) Date: Jun. 6, 2018

(87) PCT Pub. No.: WO2017/097329
PCT Pub. Date: Jun. 15, 2017

(65) Prior Publication Data
US 2018/0355810 A1    Dec. 13, 2018

(51) Int. Cl.
*B27B 17/10*    (2006.01)
*F02D 41/06*    (2006.01)
(Continued)

(52) U.S. Cl.
CPC ......... *F02D 41/062* (2013.01); *B23D 59/001* (2013.01); *B25F 5/001* (2013.01);
(Continued)

(58) Field of Classification Search
CPC .... F02D 41/062; F02D 31/001; F02D 31/006; F02D 31/009; F02D 41/0097;
(Continued)

(56) References Cited

U.S. PATENT DOCUMENTS

| 7,171,942 B2 | 2/2007 | Nickel |
| 7,536,992 B1 | 5/2009 | Wieshuber et al. |

(Continued)

FOREIGN PATENT DOCUMENTS

| CN | 85106530 A | 4/1987 |
| WO | 2009085006 A1 | 7/2009 |

OTHER PUBLICATIONS

International Search Report and Written Opinion for International Application No. PCT/EP2015/078852 dated Aug. 2, 2016.

(Continued)

*Primary Examiner* — Michelle Lopez
(74) *Attorney, Agent, or Firm* — Burr & Forman LLP

(57) ABSTRACT

Herein a hand-held power tool comprising an internal combustion engine (4) is disclosed. The hand-held power tool comprises, a working tool (6), a centrifugal clutch (8), and a control system (10). The internal combustion engine (4) has a clutch-in speed ($\omega C$) above which the internal combustion engine (4) drives the working tool (6). A speed limitation controller (14), is configured to limit an engine speed at a limitation speed below the clutch-in speed ($\omega C$). The control system (10) is configured to calculate an integral of the rotational speed of the internal combustion engine (4), and to deactivate the speed limitation controller (14) after the integral reaches an integration limit value, such that the internal combustion engine (4) is rotatable above the limitation speed ($\omega L$) to drive the working tool (6) via the centrifugal clutch (8).

15 Claims, 5 Drawing Sheets

(51) Int. Cl.
*B23D 59/00* (2006.01)
*B27B 17/08* (2006.01)
*F02P 11/00* (2006.01)
*F02D 31/00* (2006.01)
*F02D 41/02* (2006.01)
*F02D 41/08* (2006.01)
*F02P 5/15* (2006.01)
*B25F 5/00* (2006.01)
*F02B 63/02* (2006.01)
*F02D 41/00* (2006.01)
*F02D 41/26* (2006.01)
*F02N 3/02* (2006.01)
*F02N 11/00* (2006.01)

(52) U.S. Cl.
CPC .............. *B27B 17/08* (2013.01); *B27B 17/10* (2013.01); *F02B 63/02* (2013.01); *F02D 31/001* (2013.01); *F02D 31/006* (2013.01); *F02D 31/009* (2013.01); *F02D 41/0097* (2013.01); *F02D 41/022* (2013.01); *F02D 41/08* (2013.01); *F02D 41/26* (2013.01); *F02P 5/1506* (2013.01); *F02P 11/00* (2013.01); *F02D 2200/101* (2013.01); *F02N 3/02* (2013.01); *F02N 11/00* (2013.01); *Y02T 10/46* (2013.01)

(58) Field of Classification Search
CPC ........ F02D 41/022; F02D 41/08; F02D 41/26; F02D 2200/101; B23D 59/001; B25F 5/001; B24B 17/08; B27B 17/10; F02B 63/02; F02P 5/1506; F02P 11/00; F02N 11/00; Y02T 10/46
USPC .......................................................... 173/2
See application file for complete search history.

(56) References Cited

U.S. PATENT DOCUMENTS

| | | | |
|---|---|---|---|
| 7,699,039 | B2 | 4/2010 | Carlsson et al. |
| 7,735,471 | B2 | 6/2010 | Andersson et al. |
| 8,469,001 | B2 * | 6/2013 | Yoshizaki ............... F02D 11/04 |
| | | | 123/198 DC |
| 8,661,951 | B2 | 3/2014 | Gorenflo |
| 9,726,095 | B2 * | 8/2017 | Yoshizaki ............... F02B 63/02 |
| 9,759,176 | B2 * | 9/2017 | Mezaki ................. B27B 17/083 |
| 2012/0193112 | A1 | 8/2012 | Gwosdz et al. |
| 2014/0034011 | A1 | 2/2014 | Gegg et al. |
| 2015/0174751 | A1 | 6/2015 | Gorenflo et al. |

OTHER PUBLICATIONS

International Preliminary Report on Patentability for International Application No. PCT/EP2015/078852 dated Jun. 12, 2018.

* cited by examiner

HAND-HELD POWER TOOL, RELATED CONTROL SYSTEM AND ITS USE, AND METHOD OF CONTROLLING SAID TOOL

TECHNICAL FIELD

The present invention relates to a hand-held power tool comprising an internal combustion engine, to a control system for controlling an internal combustion engine of a hand-held power tool, to a use of a control system in a hand-held power tool, and to a method of controlling a hand-held power tool.

BACKGROUND

Hand-held power tools such as chain saws, cutting tools and grass trimmers that have internal combustion engines are known. Each of these types of machines has a working tool, such as a chain, one or more a cutting blades, or one or more cutting strings, which is brought to an operating motion by the combustion engine. Since the working tool is often close-by the operator, there is a risk of contact and an accidental injury occurring. Therefore, such machines are often equipped with various security arrangements for the protection of the operator.

The hand-held power tool may be equipped with a centrifugal clutch that engages the working tool when the engine exceeds a certain rotational speed. In normal operation, the centrifugal clutch improves safety because the working tool does not rotate, or oscillate, when the engine speed is below a clutch-in speed, at which the centrifugal clutch engages.

The hand-held power tool is normally started with the throttle valve of a carburettor of the combustion engine positioned in a starting position in order to ensure an efficient start-up. In the starting position, more air flows through the throttle valve than in an idle position of the throttle valve. Thus, the rotational speed of the combustion engine may immediately increase above the clutch-in speed when the engine starts. This may present a risk because the operator may not always be holding the hand-held tool in such a way that some of the security arrangements may provide the intended protection. Further, as the rotational speed of the combustion engine quickly rises upon starting, the clutch-in speed may be reached before the operator is ready for the working tool to begin rotating, or oscillating.

Various arrangements for avoiding unintentional rotation, or oscillation, of a working tool of a hand-held power tool at start-up of the internal combustion engine, i.e. for implementing a so-called start safety function, are known. In such arrangements a rotational speed limitation of the combustion engine is initiated to prevent the combustion engine from reaching the clutch-in speed. The rotational speed limitation has to be deactivated in order to rev up the combustion engine above the clutch-in speed. Deactivation may suitably be automatically performed when the operator is ready to use the hand-held power tool.

U.S. Pat. No. 7,699,039 discloses a method for controlling an ignition system of an internal combustion engine. A microcomputer operates a switch to control an ignition timing. The microcomputer is in communication with a speed sensor that detects the rotational speed of the engine and a speed limitation control that limits the engine speed to a limitation speed below the clutch-in speed of an included centrifugal clutch. The speed limitation control is active or activated when starting the engine. The speed limitation control is deactivated when a low speed state of the engine is detected.

Using the method of U.S. Pat. No. 7,699,039, the operator may experience some disadvantages when implementing a reliable start safety function. This disadvantage may be described as a delay to deactivate the start safety function, due to deactivation requiring the rotational speed of the combustion engine to be in the low speed state for a specified time. When the operator goes from idle to wide open throttle and back to idle again within short intervals, the rotation speed of the combustion engine does not reach the low speed state at all, or does not maintain the low speed state for the specified time. Thus, if the user intervenes in the regulating process by prematurely opening the throttle, the start safety function remains active and the user cannot increase the rotational speed above the clutch-in speed.

U.S. Pat. No. 7,735,471 discloses a method and system for controlling a light-duty combustion engine and, more particularly, a method and system that use an engine speed governor to limit the engine speed to a level that is less than a clutch-in speed of a centrifugal clutch. If it is determined that an operator is attempting to throttle or accelerate the engine, the engine speed governor is disengaged if a specific criterion is fulfilled such that normal operation can commence.

U.S. Pat. No. 8,661,951 discloses a hand-guided power tool having a drive motor and a drive element connected to and driven by the drive motor. A working tool is connected to the drive element and driven by the drive element. A braking device is correlated with the drive element, wherein the braking device in a first state, in which the braking device is applied, blocks the drive element and in a second state, in which the braking device is released, releases the drive element so that the drive elements can rotate freely. The braking device has a brake lever and a sensor that detects the first and second states of the braking device. A control unit is provided, wherein an output signal of the sensor as a state signal of the first state or the second state is supplied to the control unit. The control unit, based on the state signal, controls devices of the power tool.

SUMMARY

It is an object of the present invention to provide a hand-held power tool, in which a start safety function is deactivated if it is determined that an operator is actively attempting to operate the hand-held power tool.

According to an aspect of the invention, the object is achieved by a hand-held power tool comprising an internal combustion engine, a working tool, a centrifugal clutch, and a control system. The working tool is driven by the internal combustion engine via the centrifugal clutch. The internal combustion engine has a clutch-in speed above which the internal combustion engine drives the working tool. The internal combustion engine is controlled by the control system. The control system comprises a rotation speed sensor, and a speed limitation controller. The speed limitation controller is configured to limit an engine speed at a limitation speed, which limitation speed is below the clutch-in speed. The speed limitation controller is active or activated during a starting procedure of the internal combustion engine. The control system is configured to calculate an integral of the rotational speed of the internal combustion engine, and to deactivate the speed limitation controller after the integral reaches an integration limit value, such that the internal combustion engine is rotatable above the limitation speed to drive the working tool via the centrifugal clutch.

Since the control system is configured to calculate an integral of the rotational speed of the internal combustion engine, and to deactivate the speed limitation controller after the integral reaches an integration limit value, an active operation of the hand-held power tool by an operator has been detected and thus, the hand-held power tool is permitted to be operated above the clutch-in speed with the working tool in operation. As a result, the above mentioned object is achieved.

At the limitation speed the control system initiates measures preventing the internal combustion engine from reaching the clutch-in speed. Such measures are known in the art and may comprise one or more of the following: switching off an ignition of the internal combustion engine, altering the ignition timing of the internal combustion engine, affecting a fuel injection system, if the internal combustion engine is provided with a fuel injection system. Thus, the start safety function of the hand-held power tool is implemented. Despite a hand-held power tool having a speed limitation controller configured to limit an engine speed at a limitation speed, the internal combustion engine may be accelerated above the limitation speed under certain circumstances. For instance when reving up the internal combustion engine from a rotational speed somewhat below the limitation speed the limitation speed may be exceeded. Thus, acceleration of the internal combustion engine at a level above the limitation speed may be performed in some types of hand-held power tools. For instance, if the ignition of the internal combustion engine is switched off at the limitation speed, an acceleration initiated below the limitation speed may continue above the limitation speed due to the moment of inertia of the rotating parts of the internal combustion engine. An abrupt restriction to the limitation speed is not possible in such case. Similarly, also for the other measures of limiting the rotational speed discussed above, the moment of inertia may cause accelerations to continue above the limitation speed.

The hand-held power tool may be e.g. a chain saw, a cutting tool, a hedge trimmer, a grass trimmer, etc. Accordingly, the working tool may be e.g. a saw chain, a saw blade, one or more cutting blades, a string, etc. As used herein the term hand-held power tool also encompasses power tools which may be supported by an operator in other ways than carrying the entire weight of the power tool with his or her hands, such as supporting the weight of the power tool on the shoulders or the back of the operator. The latter type of power tool is hand-held in the sense that it is guided by one or both hands of the operator. A starting procedure of the internal combustion engine is an operation performed to start the internal combustion engine in order to make the internal combustion run on fuel supplied to the internal combustion engine. For instance a pull starter utilising a recoil spring, or an electric starter motor may be used during a least part of the starting procedure.

According to embodiments, the control system may be configured to deactivate the speed limitation controller upon the rotational speed of the internal combustion engine dropping below a deactivation rotational speed after the integral has reached the integration limit value. In this manner a further safety measure may be implemented, which may ensure that the speed limitation controller is not deactivated if a throttle valve of the internal combustion engine should accidentally get suck in an open position thus, reaching the integration limit value without active manipulation of the throttle valve by the operator. Only after the operator has decreased the engine speed below the deactivation rotational speed, the speed limitation controller may be deactivated.

It is a further object of the present invention to provide a control system for a hand-held power tool, in which a start safety function is deactivated if it is determined that an operator is actively attempting to operate the hand-held power tool.

According to an aspect of the invention, the object is achieved by a control system for controlling an internal combustion engine of a hand-held power tool, the hand-held power tool comprising a working tool, and a centrifugal clutch. The internal combustion engine has a clutch-in speed above which the internal combustion engine drives the working tool. The control system comprises a rotation speed sensor, and a speed limitation controller. The speed limitation controller is configured to limit an engine speed at a limitation speed, which limitation speed is below the clutch-in speed. The speed limitation controller is active or activated during a starting procedure of the internal combustion engine. The control system is configured to calculate an integral of the rotational speed of the internal combustion engine, and to deactivate the speed limitation controller after the integral reaches an integration limit value, such that the internal combustion engine is rotatable above the limitation speed to drive the working tool via the centrifugal clutch.

Reaching the integration limit value indicates that an operator is actively attempting to operate the hand-held power tool, and the control system in response thereto deactivating the speed limitation controller, entails that the control system is permitted to operate the hand-held power tool above the clutch-in speed with the working tool in operation. As a result, the above mentioned object is achieved. In this manner the internal combustion engine is rotatable above the limitation speed and above the clutch-in speed to drive the working tool via the centrifugal clutch.

According to a further aspect of the invention, there is provided a use of the control system according to any one aspect and/or embodiment discussed herein in a hand-held power tool. The hand-held power tool comprises an internal combustion engine, a working tool, and a centrifugal clutch. The working tool is driven by the internal combustion engine via the centrifugal clutch.

According to a further aspect of the invention, there is provided a method of controlling a hand-held power tool, the hand-held power tool comprising an internal combustion engine, a working tool, a centrifugal clutch, and a control system. The working tool is driven by the internal combustion engine via the centrifugal clutch. The internal combustion engine has a clutch-in speed above which the internal combustion engine drives the working tool. The internal combustion engine is controlled by the control system. The control system comprises a rotation speed sensor, and a speed limitation controller. The speed limitation controller is configured to limit an engine speed at a limitation speed, which limitation speed is below the clutch-in speed. The method comprises steps of:

activating the speed limitation controller prior to, or during, a starting procedure of the internal combustion engine, calculating an integral of the rotational speed of the internal combustion engine, reaching an integration limit value, and deactivating the speed limitation controller.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1A:
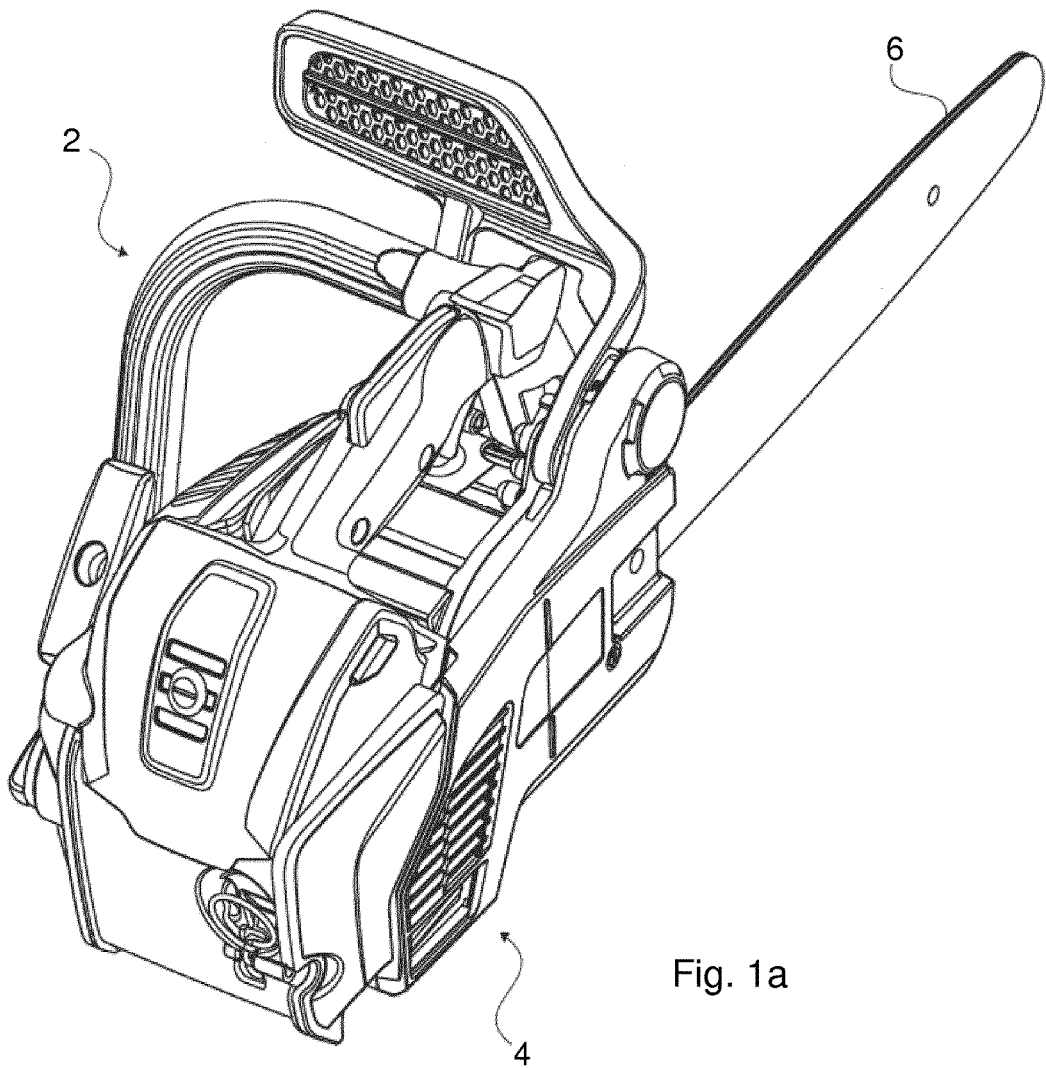
FIG. 1a illustrates a hand-held power tool according to embodiments.
Figure 1B:
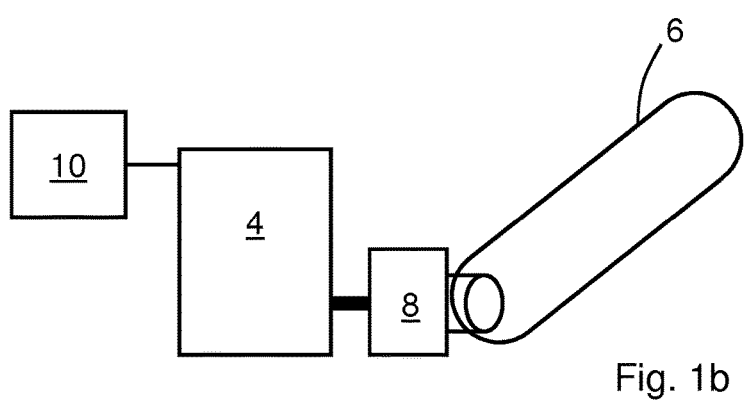
FIG. 1b illustrates schematically components of a hand-held power tool.

FIG. 1a illustrates a hand-held power tool 2 according to embodiments. In these embodiments the hand-held power tool is a chainsaw 2. FIG. 1b illustrates schematically components of the hand-held power tool 2. In the following reference is made to FIGS. 1a-1b. The hand-held power tool 2 comprises an internal combustion engine 4, a working tool 6 in the form of a saw chain, a centrifugal clutch 8, and a control system 10. The working tool 6 is driven by the internal combustion engine 4 via the centrifugal clutch 8. The internal combustion engine 4 is controlled by the control system 10. The internal combustion engine 4 has a clutch-in speed above which the internal combustion engine 4 drives the working tool 6. That is, at the clutch-in speed, the internal combustion engine 4 has a rotational speed sufficient for rotating the centrifugal clutch 8 at a speed such that it engages thus, driving the working tool 6. Below the clutch-in speed the internal combustion engine 4 has a rotational speed which is too low for rotating the centrifugal clutch 8 at a speed such that it engages, i.e. below the clutch-in speed the working tool 6 is not driven by the centrifugal clutch 8.

Figure 1C:
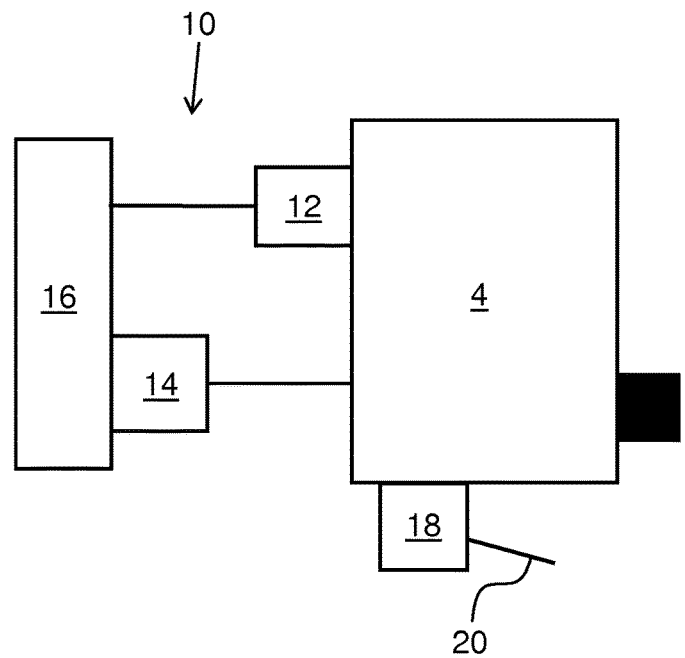
FIG. 1c illustrates schematically a control system of a hand-held power tool.

FIG. 1c illustrates schematically a control system 10 of a hand-held power tool. The control system 10 comprising a rotation speed sensor 12, and a speed limitation controller 14. The rotation speed sensor 12 is configured to sense a rotational speed of the internal combustion engine 4, and may be arrange on the internal combustion engine 4 to sense a rotation of a crankshaft of the engine 4. The speed limitation controller 14 is configured to limit an engine speed as a start safety function during start-up of the hand-held power tool, in particular during starting of the engine 4. The speed limitation controller 14, when activated, limits the rotational speed of the internal combustion engine 4 at a limitation speed, which limitation speed is below the clutch-in speed thus, preventing the engine 4 from reaching the clutch-in speed. The intention is that the speed limitation controller 14 will, when the operator starts the engine 4, stop the internal combustion engine 4 from revving up such that the centrifugal clutch 8 is prevented from driving the working tool 6. An uncontrolled driving of the working tool 6 may be dangerous for the operator. The speed limitation controller 14 is active or activated during a starting procedure of the internal combustion engine 4. The speed limitation controller 14 may only dependent on the starting of the internal combustion engine 4. This may entail that the activation of the speed limitation controller 14 may not relate to any requirement except the fact that the internal combustion engine 4 is being started. Thus, failure of the start safety function may be avoided.

The control system 10 further comprises a control unit 16, such as a central processing unit (CPU), microprocessor or similar unit, with associated memory function for storing a computer program for controlling the speed limitation controller 14, and optionally for controlling further functions of the internal combustion engine 4 and/or the hand-held power tool. The speed limitation controller 14 may be implemented as a function in the control unit 16, or may form a separate unit communicating with the control unit 16. The rotation speed sensor 12 is connected to the control unit 16. The rotation speed sensor 12 communicates data of the engine 4 to the control unit 16. Such data may be actual rotational speed data, or more or less raw data, which is used by the control unit 16 for calculating one or more different rotational speed data. Rotational speed data may be e.g. revolutions per minute (rpm), revolutions per second (rps), rad/s, average rotational speed over a specific period of time, average rotational speed over as specific number of revolutions of the engine, or any other type of filter algorithm. Within the scope of the invention every type of speed sensor is considered, including both direct and indirect sensing of the rotational speed of the internal combustion engine 4. Examples of direct detection or sensing would be the utilization of magnetic or hall-effect sensors for detecting the rotation of the shaft or an electric sensor for detecting the current generated by a primary firing pulse generator of the combustion engine. An example of an indirect detection of the rotational speed of the engine would be the detection and counting of ignitions of a fuel/air mixture in a cylinder of the internal combustion engine 4.

In accordance with the present invention the control system 10 is configured to calculate an integral of the rotational speed of the internal combustion engine 4, and to deactivate the speed limitation controller 14 after the integral reaches an integration limit value. Thus, by running the internal combustion engine 4 until the integration limit value has been reached, the operator may indicate to the control system 10 that he, or she, is ready to operate the hand-held power tool 2. This may entail that the engine 4 is run at a comparatively low rotational speed over a longer time period, or at a comparatively high rotational speed over a shorter time period. After the speed limitation controller 14 has been deactivated, the hand-held power tool 2 is fully operational with the working tool 6 operable, i.e. the start safety function has been deactivated.

The internal combustion engine 4 comprises according to some embodiments a throttle valve 18. A throttle lever 20 is controlled by the operator of the hand-held power tool 2 in order to control an opening degree of the throttle valve 18 and thus, the rotational speed of the internal combustion engine 4. The hand-held power tool 2 may comprise a throttle valve 18 positionable in a starting position, the starting position resulting in the internal combustion engine 4 reaching the limitation speed. More specifically, prior to starting the internal combustion engine 4, the throttle valve 18 may be positioned such that when the engine 4 starts, it reaches the limitation speed.

It may be mentioned that the internal combustion engine 4 may be operated at speeds lower than the limitation speed, e.g. at an idle speed when the throttle lever 20 is released by the operator.

Alternative means of controlling the rotational speed of the internal combustion engine 4 may be a controller of a fuel injection system, in case the internal combustion engine 4 comprises such a system.

Figure 2A:
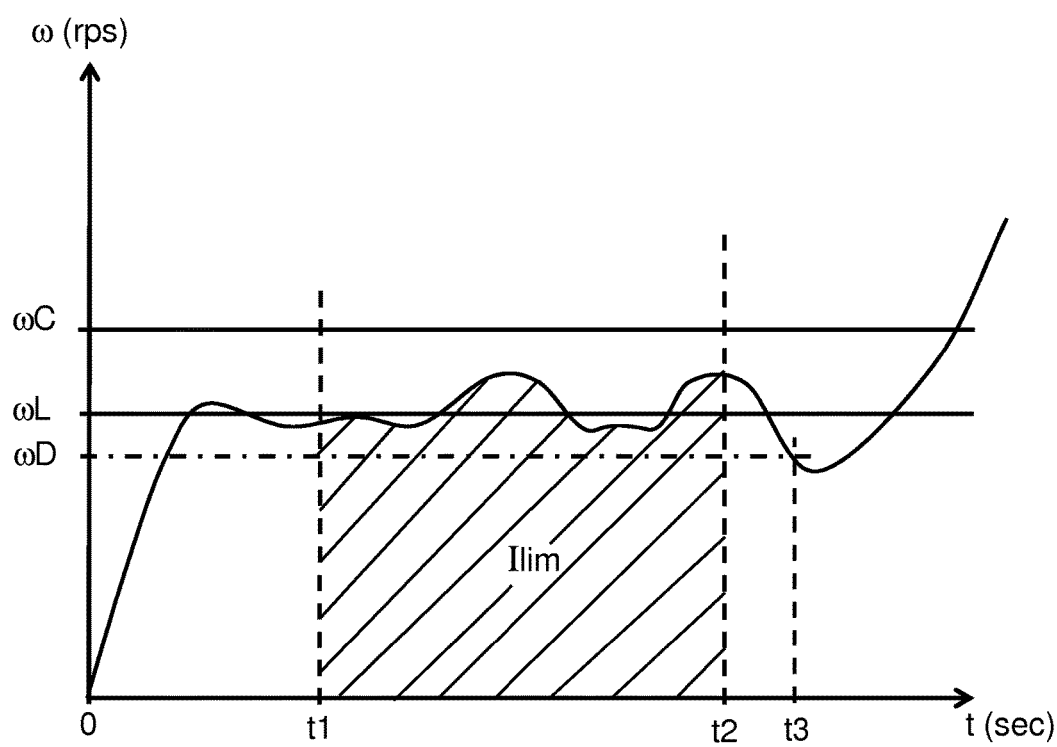
FIGS. 2a-2c illustrates diagrams depicting operation of control systems for controlling an internal combustion engine of a hand-held power tool according to various embodiments.
Figure 2B:
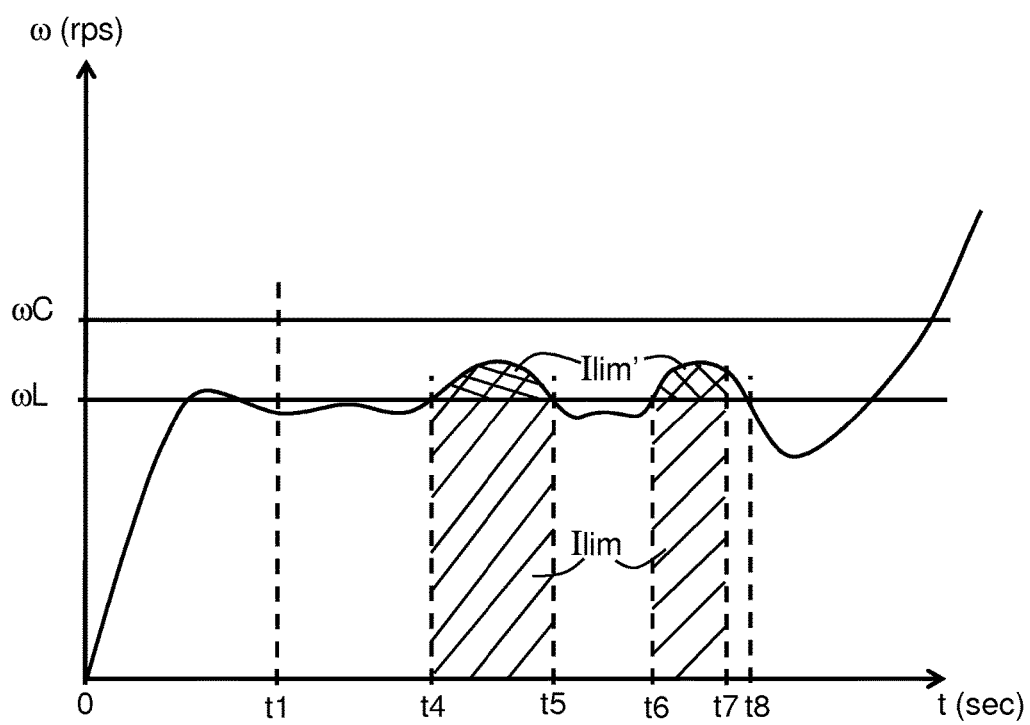
Figure 2C:
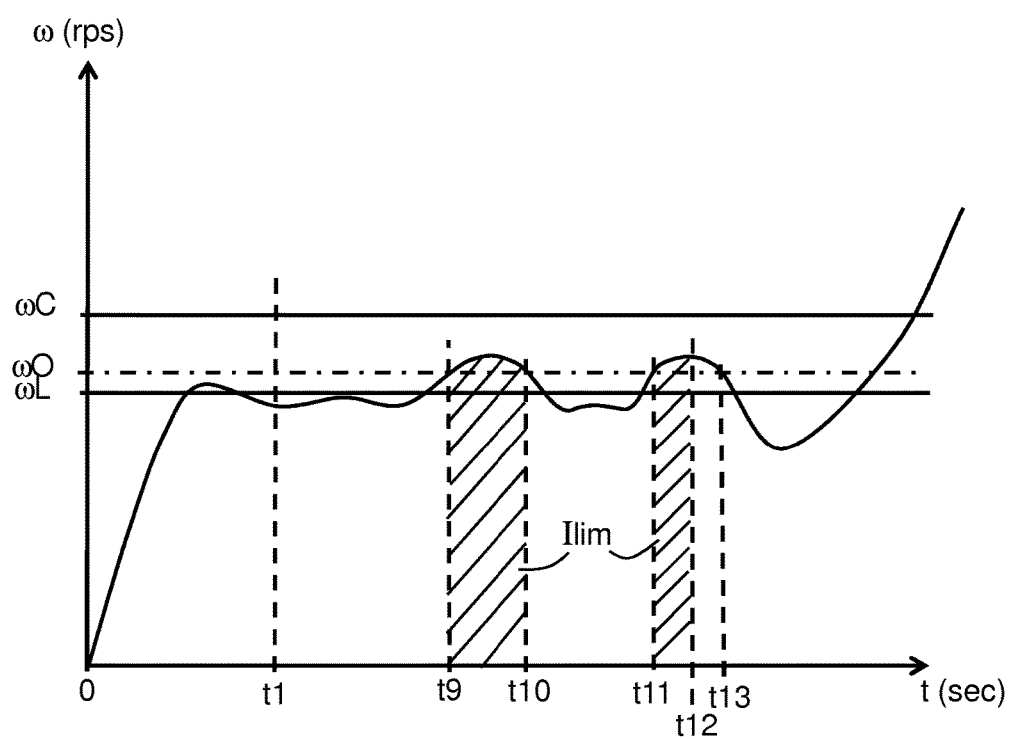

FIGS. 2a-2c illustrates diagrams depicting operation of control systems for controlling an internal combustion engine of a hand-held power tool according to various embodiments. Moreover, FIG. 2a-2c illustrate methods of controlling a hand-held power tool according to various embodiments. The control system may be a control system 10 as discussed above in connection with FIG. 1c.

In the diagrams, time, t, is represented on the X-axis and rotations per time unit, $\omega$, of the internal combustion engine are represented on the Y-axis. As discussed above, the hand-held power tool has a clutch-in speed, $\omega C$, and a limitation speed, $\omega L$. At t=0 the internal combustion engine is started and the speed limitation controller is active. The control system may be configured to implement a time delay between a starting of the internal combustion engine and allowing deactivation of the speed limitation controller. During the time delay, i.e. in the diagram from t=0 to t=t1, the speed limitation controller is not deactivated. That is, during the time delay the speed limitation controller remains activated. It remains activated, irrespective of how the internal combustion engine itself behaves immediately after it has started, or of how the operator attempts to control the internal combustion engine or the hand-held power tool. The time delay may be provided for the internal combustion engine to start and run on fuel supplied to it prior to imposing further control parameters on the internal combustion engine. Moreover, an acceleration of the internal combustion engine during a starting procedure thereof may not be mistaken for an intentional acceleration of the internal combustion engine by the operator. Thus, the internal combustion engine may be reliably started without accidentally deactivating the speed limitation controller. The internal combustion engine may thus, start reliably before an operator is permitted to control the internal combustion engine.

As discussed above, the control system is configured to calculate an integral of the rotational speed of the internal combustion engine, and to deactivate the speed limitation controller after the integral reaches an integration limit value, Ilim.

In the diagram of FIG. 2a the integration limit value, Ilim, is represented by the area below the graph representing the rotational speed of the internal combustion engine. In these embodiments, the integral of the rotational speed of the internal combustion engine is calculated from the end of the time delay, i.e. from t=t1. The graph representing the rotational speed of the internal combustion engine varies to some extent around the limitation speed, $\omega L$, which indicates that an operator of the hand-held power tool is manipulating the throttle of the internal combustion engine. Thus, integration limit value, Ilim, is reached at t2. if the operator would manipulate the throttle to a lesser degree, or even refrain from attempting to manipulate the throttle, the integration limit value, Ilim, would be reached at a point later in time than t2. In case the integration limit value, Ilim, is reached without the operator manipulating the throttle, i.e. the integration limit value, Ilim, is reached with the engine idling, the assumption would be that sufficient time has passed since starting the engine in order for the operator to grasp and handle the hand-held power tool in a safe manner.

In alternative embodiments, the integral of the rotational speed of the internal combustion engine may be calculated from t=0. The integration limit value, Ilim, may in such embodiments be larger than illustrated in FIG. 2a to an extent including the integral of the rotational speed of the internal combustion engine during the time delay, i.e. from t=0 to t=t1.

In practice, according to some embodiments the integral may be calculated by the control unit 16 summing up the rotational speed of the internal combustion engine multiplied by time. For instance, the rotational speed may be sampled at regular time intervals and multiplied by the length of one such time interval, the resulting products are summed up. The sum is compared to the integration limit value, Ilim. Instead of sampling the rotational speed at regular time intervals, the rotational speed may be sampled every rotation of the internal combustion engine. Despite such a sampling time being dependent on the rotational speed of the internal combustion engine, it may be sufficiently precise for calculating the integral as a sum of each rotational speed sample.

The control system may additionally be configured to deactivate the speed limitation controller upon the rotational speed of the internal combustion engine dropping below a deactivation rotational speed after the integral has reached the integration limit value, Ilim.

In these embodiments, the deactivation rotational speed corresponds to a particular rotational speed, $\omega D$, below the limitation speed, $\omega L$. That is, after the integration limit value, Ilim, has been reached, the rotational speed of the internal combustion engine has to drop below the particular rotational speed, $\omega D$, before the speed limitation controller is deactivated and the rotational speed of the internal combustion engine is permitted to increase above the limitation speed, $\omega L$, and the clutch-in speed, $\omega C$. In the diagram of FIG. 2a the rotational speed of the internal combustion engine drops below the particular rotational speed, $\omega D$, at t3.

According to the embodiments illustrated in FIG. 2b, the control system is configured to calculate the integral of the rotational speed only at a level above the limitation speed, $\omega L$. Again, in the diagram the integration limit value, Ilim, is represented by the area below the graph representing the rotational speed of the internal combustion engine. However, in these embodiments the integral of the rotational speed of the internal combustion engine is calculated only when the rotational speed of the internal combustion engine exceeds the limitation speed, $\omega L$. In the example illustrated, the integral is calculated from t4 to t5. At t5 the integration limit value, Ilim, has not yet been reached. Accordingly, at t6 when the rotational speed of the internal combustion engine again exceeds the limitation speed, $\omega L$, calculation of the integral is continued. At t7 the integration limit value, Ilim, has been reached.

As an alternative to representing the integration limit value, Ilim, by the area below the graph representing the rotational speed of the internal combustion engine, the integration limit value, Ilim', may be represented by the area between the limitation speed, $\omega L$, and the graph representing the rotational speed of the internal combustion engine, as indicated with the crosshatched area in FIG. 2b. Accordingly, when calculating the integral in such embodiments, the rotational speed difference between the rotational speed of the internal combustion engine and the limitation speed, $\omega L$, is multiplied with the time interval, during periods when the rotational speed of the internal combustion engine exceeds the limitation speed, $\omega L$.

Again, the control system is configured to deactivate the speed limitation controller upon the rotational speed of the internal combustion engine dropping below a deactivation rotational speed after the integral has reached the integration limit value, Ilim. In these embodiment, the deactivation rotational speed corresponds to the limitation speed, $\omega L$. That is, after the integration limit value, Ilim, has been reached, the rotational speed of the internal combustion engine has to drop below the limitation speed, $\omega L$, before the speed limitation controller is deactivated and the rotational speed of the internal combustion engine is permitted to increase above the limitation speed, $\omega L$, and the clutch-in speed, $\omega C$. In the diagram of FIG. 2b the rotational speed of the internal combustion engine drops below the limitation speed, $\omega L$, at t8.

Alternatively, the deactivation rotational speed may correspond to a particular rotational speed, $\omega D$, below the limitation speed, $\omega L$, as discussed in the connection with FIG. 2a may be applied. If the particular rotational speed, $\omega D$, is at the limitation speed, $\omega L$, minor rotational speed variations of the internal combustion engine around the limitation speed, $\omega L$, which may occur during certain engine operating conditions, might be mistaken for a drop below the particular rotational speed, $\omega D$.

According to the embodiments illustrated in FIG. 2c, an offset speed $\omega O$ below the clutch-in speed $\omega C$ is set in the control system. The control system is configured to calculate the integral of the rotational speed only at a level above the offset speed $\omega O$. Again, in the diagram the integration limit value, Ilim, is represented by the area below the graph representing the rotational speed of the internal combustion engine. In these embodiments the integral of the rotational speed of the internal combustion engine is calculated only when the rotational speed of the internal combustion engine exceeds the offset speed, $\omega O$. In the example illustrated, the integral is calculated from t9 to t10. At t10 the integration limit value, Ilim, has not yet been reached. Accordingly, at t11 when the rotational speed of the internal combustion engine again exceeds the offset speed, $\omega O$, calculation of the integral is continued. At t12 the integration limit value, Ilim, has been reached.

Again, the control system is configured to deactivate the speed limitation controller upon the rotational speed of the internal combustion engine dropping below a deactivation rotational speed after the integral has reached the integration limit value, Ilim. In these embodiment, the deactivation rotational speed corresponds to the offset speed $\omega O$. That is, after the integration limit value, Ilim, has been reached, the rotational speed of the internal combustion engine has to drop below the offset speed, $\omega O$, before the speed limitation controller is deactivated and the rotational speed of the internal combustion engine is permitted to increase above the limitation speed, $\omega L$, and the clutch-in speed, $\omega C$. In the diagram of FIG. 2c the rotational speed of the internal combustion engine drops below the offset speed, $\omega O$, at t13.

Again, the deactivation rotational speed may alternatively correspond to a particular rotational speed, $\omega D$, below the limitation speed, $\omega L$, as discussed in the connection with FIG. 2a. As a further alternative the deactivation rotational speed may correspond to the limitation speed, $\omega L$, as discussed in the connection with FIG. 2b.

As in the embodiments discussed in connection with FIG. 2b, as an alternative to representing the integration limit value, Ilim, by the area below the graph representing the rotational speed of the internal combustion engine, the integration limit value may be represented by the area between the limitation speed, $\omega L$, and the graph representing the rotational speed of the internal combustion engine, or by the area between the offset speed, $\omega O$, and the graph representing the rotational speed of the internal combustion engine.

In the embodiments discussed in connection with FIG. 2c the offset speed, $\omega O$, is set between the limitation speed, $\omega L$, and the clutch-in speed, $\omega C$. In comparison with embodiments wherein the integral is calculated at a level above the limitation speed, $\omega L$, in these embodiments where the integral is calculated at a level above the offset speed, $\omega O$, the integral will not be calculated due to minor rotational speed variations of the internal combustion engine around the limitation speed, $\omega L$, which may occur during certain engine operating conditions. Alternatively, the offset speed, $\omega O$, may be set below the limitation speed, $\omega L$, e.g. at the particular rotational speed, $\omega D$, illustrated in FIG. 2a.

Mentioned purely as an example, for a chainsaw having a 2-stroke internal combustion engine of 50 cm3, the limitation speed, $\omega L$, may be approximately 60 rps, the clutch-in speed, $\omega C$, may be approximately 68 rps, and the offset speed, $\omega O$, may be approximately 63 rps, the rotational speed being an average rotational speed calculated over the latest 10 revolutions of the engine.

Figure 3:
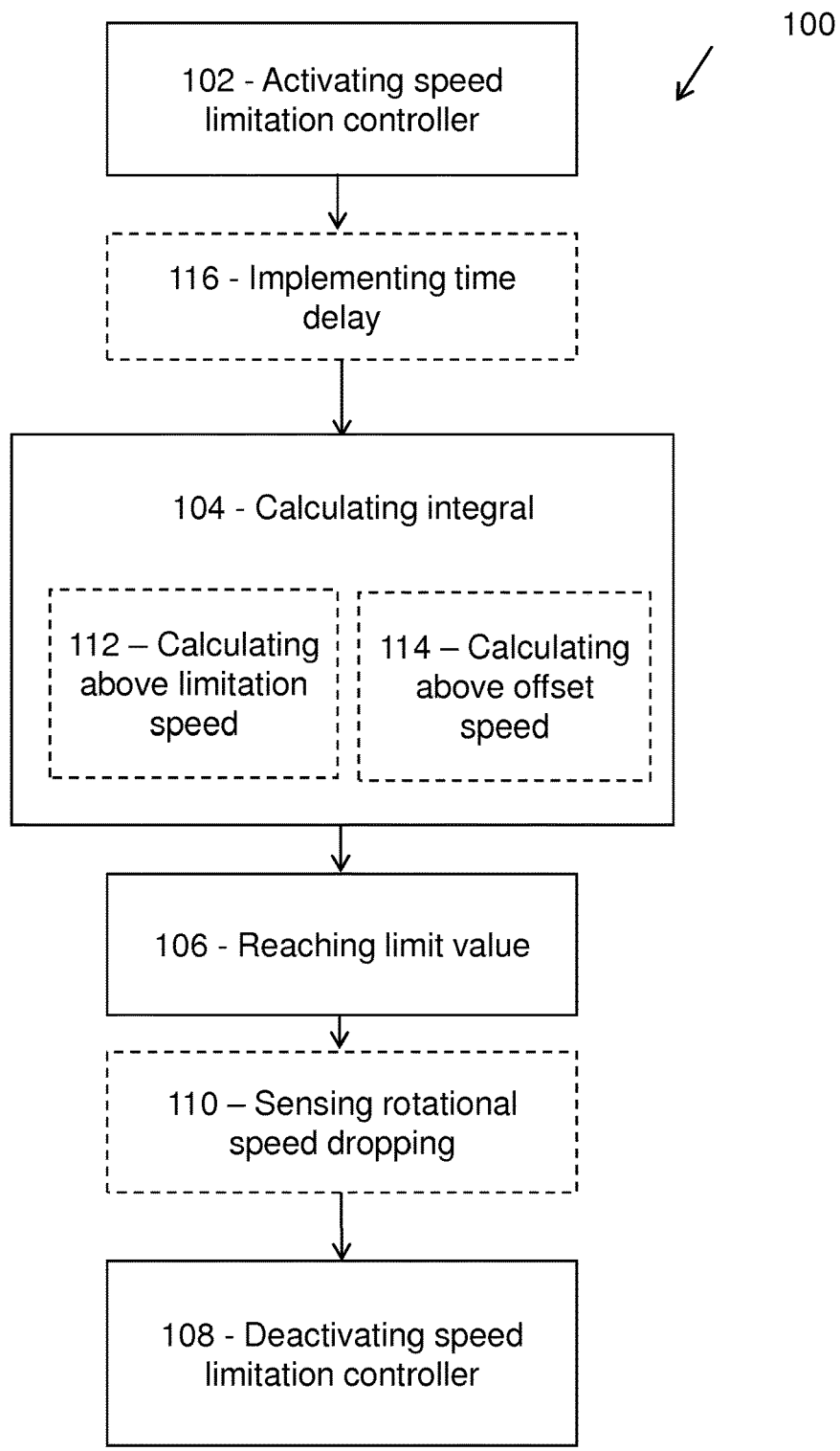
FIG. 3 illustrates a method of controlling a hand-held power tool.

FIG. 3 illustrates a method 100 of controlling a hand-held power tool. The hand-held power tool may be a hand-held power tool 2 as discussed above in connection with FIGS. 1a-1c. The hand-held power tool may comprise a control system 10 as discussed in connection with FIGS. 1c-2c. The diagrams of FIGS. 2a-2c also relate to the method 100 of controlling the hand-held power tool.

The method 100 comprises steps of:
activating 102 the speed limitation controller prior to, or during, a starting procedure of the internal combustion engine,
calculating 104 an integral of the rotational speed of the internal combustion engine,
reaching 106 an integration limit value, and
deactivating 108 the speed limitation controller.

The step of calculating 104 the integral of the rotational speed of the internal combustion engine results ultimately in the step of reaching 106 the integration limit value. The integration limit value may be reached over one continuous calculation of the integral, e.g. as illustrated in FIG. 2a, or alternatively, over two or more consecutive calculations of the integral, which two or more calculations form an accumulated sum of the integral, eventually reaching the integration limit value, e.g. as illustrated in FIGS. 2b and 2c.

According to embodiments, the method 100 may comprise a step of:
sensing 110 the rotational speed of the internal combustion engine dropping below a deactivation rotational speed, after the step of reaching 106 an integration limit value, and prior to the step of deactivating 108 the speed limitation controller.

According to embodiments, the step of calculating 104 an integral may comprise:
calculating 112 the integral of the rotational speed only at a level above the limitation speed, $\omega L$.

According to embodiments, an offset speed, $\omega O$, below the clutch-in speed, $\omega C$, may be set, and the step of calculating 104 an integral may comprise:
calculating 114 the integral of the rotational speed only at a level above the offset speed, $\omega O$.

According to embodiments, the method may comprise a step of:

implementing 116 a time delay between a starting of the internal combustion engine and the deactivating 108 of the speed limitation controller.

The step of implementing 116 the time delay may be performed prior to the step of calculating 104 the integral of the rotational speed of the internal combustion engine, as illustrated in FIG. 3. In alternative embodiments the step of implementing 116 the time delay may be performed in parallel with the step of calculating 104 the integral of the rotational speed of the internal combustion engine.

The length of the time delay may be chosen such that the internal combustion engine is permitted to stabilize its speed during the starting of the internal combustion engine, depending on the hand-held power tool and its internal combustion engine, the time delay may be between 1 second and up to 30-60 seconds.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. For instance, it is to be understood that the control system may be configured to deactivate the speed limitation controller 14 based on further criteria, such as e.g. the low speed state of an internal combustion engine as discussed in U.S. Pat. No. 7,699,039.

The invention claimed is:

1. A hand-held power tool comprising an internal combustion engine, a working tool, a centrifugal clutch, and a control system, wherein the working tool is driven by the internal combustion engine via the centrifugal clutch, wherein the internal combustion engine has a clutch-in speed above which the internal combustion engine drives the working tool, wherein the internal combustion engine is controlled by the control system, the control system comprising a rotation speed sensor, and a speed limitation controller, wherein the speed limitation controller is configured to limit an engine speed at a limitation speed, the limitation speed being below the clutch-in speed, and wherein the speed limitation controller is active or activated during a starting procedure of the internal combustion engine,
characterised in that the control system is configured to calculate an integral of the rotational speed of the internal combustion engine, and to deactivate the speed limitation controller after the integral reaches an integration limit value, such that the internal combustion engine is rotatable above the limitation speed to drive the working tool via the centrifugal clutch.

2. The hand-held power tool according to claim 1, wherein the control system is configured to deactivate the speed limitation controller upon the rotational speed of the internal combustion engine dropping below a deactivation rotational speed after the integral has reached the integration limit value.

3. The hand-held power tool according to claim 2, wherein the deactivation rotational speed corresponds to the offset speed, or the limitation speed.

4. The hand-held power tool according to claim 1, wherein the control system is configured to calculate the integral of the rotational speed only at a level above the limitation speed.

5. The hand-held power tool according to claim 1, wherein an offset speed below the clutch-in speed is set in the control system, and wherein the control system is configured to calculate the integral of the rotational speed only at a level above the offset speed.

6. A control system for controlling an internal combustion engine of a hand-held power tool, the hand-held power tool comprising a working tool, and a centrifugal clutch, wherein the internal combustion engine has a clutch-in speed above which the internal combustion engine drives the working tool, wherein the control system comprises a rotation speed sensor, and a speed limitation controller, wherein the speed limitation controller is configured to limit an engine speed at a limitation speed, which limitation speed is below the clutch-in speed, and wherein the speed limitation controller is active or activated during a starting procedure of the internal combustion engine,
characterised in that the control system is configured to calculate an integral of the rotational speed of the internal combustion engine, and to deactivate the speed limitation controller after the integral reaches an integration limit value, such that the internal combustion engine is rotatable above the limitation speed to drive the working tool via the centrifugal clutch.

7. The control system according to claim 6, wherein the control system is configured to deactivate the speed limitation controller upon the rotational speed of the internal combustion engine dropping below a deactivation rotational speed after the integral has reached the integration limit value.

8. The control system according to claim 7, wherein the control system is configured to calculate the integral of the rotational speed only at a level above the limitation speed.

9. The control system according to claim 7, wherein the deactivation rotational speed corresponds to the offset speed, or the limitation speed.

10. The control system according to claim 6, wherein an offset speed below the clutch-in speed is set in the control system, and wherein the control system is configured to calculate the integral of the rotational speed only at a level above the offset speed.

11. Use of the control system according to claim 6 in the hand-held power tool, wherein the working tool is driven by the internal combustion engine via the centrifugal clutch.

12. A method of controlling a hand-held power tool, the hand-held power tool comprising an internal combustion engine, a working tool, a centrifugal clutch, and a control system, wherein the working tool is driven by the internal combustion engine via the centrifugal clutch, wherein the internal combustion engine has a clutch-in speed above which the internal combustion engine drives the working tool, wherein the internal combustion engine is controlled by the control system, the control system comprising a rotation speed sensor, and a speed limitation controller, wherein the speed limitation controller is configured to limit an engine speed at a limitation speed, which limitation speed is below the clutch-in speed, wherein the method comprises steps of:
activating the speed limitation controller prior to, or during, a starting procedure of the internal combustion engine,
calculating an integral of the rotational speed of the internal combustion engine,
reaching an integration limit value, and
deactivating the speed limitation controller in response to reaching the integration limit value.

13. The method according to claim 12, comprising a step of:
sensing the rotational speed of the internal combustion engine dropping below a deactivation rotational speed, after the step of reaching (an integration limit value, and prior to the step of deactivating the speed limitation controller.

14. The method according to claim 12, wherein the step of calculating the integral comprises:
   calculating the integral of the rotational speed only at a level above the limitation speed.

15. The method (100) according to claim 12, wherein an offset speed below the clutch-in speed is set, and wherein the step of calculating the integral comprises:
   calculating the integral of the rotational speed only at a level above the offset speed.

* * * * *